United States Patent
West et al.

(10) Patent No.: US 9,233,481 B2
(45) Date of Patent: Jan. 12, 2016

(54) METHOD OF PATTERNING ELECTRICALLY-CONDUCTIVE FILM ON FLEXIBLE SUBSTRATES

(71) Applicant: Kent State University, Kent, OH (US)

(72) Inventors: John L. West, Hartville, OH (US); Da-Wei Lee, Kent, OH (US)

(73) Assignee: Kent State University, Kent, OH (US)

( * ) Notice: Subject to any disclaimer, the term of this patent is extended or adjusted under 35 U.S.C. 154(b) by 479 days.

(21) Appl. No.: 13/721,312

(22) Filed: Dec. 20, 2012

(65) Prior Publication Data

US 2013/0186925 A1 Jul. 25, 2013

Related U.S. Application Data

(60) Provisional application No. 61/632,236, filed on Jan. 20, 2012.

(51) Int. Cl.
*H05K 3/00* (2006.01)
*B26F 3/00* (2006.01)
*G02F 1/1343* (2006.01)

(52) U.S. Cl.
CPC .............. *B26F 3/00* (2013.01); *G02F 1/13439* (2013.01); *Y10T 29/49002* (2015.01); *Y10T 29/49124* (2015.01); *Y10T 225/16* (2015.04)

(58) Field of Classification Search
CPC .................. Y10T 29/49124; Y10T 29/49117; Y10T 29/49002; Y10T 29/49135; Y10T 29/49156; Y10T 29/49167; Y10T 428/31797; Y10T 428/31681; Y10T 428/31993; Y10T 428/1055; Y10T 428/2457; Y10T 428/24612
USPC ................. 29/829, 825, 592.1, 835, 847, 853; 225/4; 428/172, 323, 458, 483, 167; 427/331, 289, 508; 156/205, 210, 64, 156/733.3
See application file for complete search history.

(56) References Cited

U.S. PATENT DOCUMENTS

| | | | |
|---|---|---|---|
| 4,528,833 A | 7/1985 | Inaike et al. | |
| 5,148,760 A | 9/1992 | Miyauchi | |
| 6,049,366 A * | 4/2000 | Hakemi | C09K 19/40 349/157 |
| 7,075,613 B2 * | 7/2006 | Kumar | G02F 1/13394 349/156 |
| 2002/0043901 A1 * | 4/2002 | Kihara | H01L 41/0472 310/366 |
| 2007/0080627 A1 | 4/2007 | Sakamoto | |
| 2007/0115572 A1 * | 5/2007 | Van Dam | G02F 1/133305 359/883 |
| 2007/0116932 A1 * | 5/2007 | Van Der Tempel | G02F 1/133305 428/172 |

(Continued)

FOREIGN PATENT DOCUMENTS

JP 11329093 A * 11/1999
JP 2000218720 A * 8/2000

*Primary Examiner* — Peter DungBa Vo
*Assistant Examiner* — Azm Parvez
(74) *Attorney, Agent, or Firm* — Renner, Kenner, Greive, Bobak, Taylor & Weber

(57) ABSTRACT

A method of patterning an electrically-conductive film is performed by providing a flexible substrate that carries the electrically-conductive film thereon to form a combined layer. The combined layer is then bent about a radius of curvature, so as to impart a stress on the brittle conductive film along the axis of curvature of the curved surface. The application of the stress to the conductive film results in the formation of crack lines that are substantially perpendicular to the direction to which the substrate and conductive film are bent. The crack lines serve to define and electrically isolate conductive sections therebetween that can be utilized as electrodes and address lines in electronic devices.

20 Claims, 3 Drawing Sheets

(56) References Cited

U.S. PATENT DOCUMENTS

| | | | |
|---|---|---|---|
| 2008/0055831 A1* | 3/2008 | Satoh | G02F 1/133305 361/600 |
| 2010/0243733 A1 | 9/2010 | Faith et al. | |
| 2010/0247810 A1* | 9/2010 | Yukinobu | H01B 1/08 428/1.4 |
| 2010/0323186 A1* | 12/2010 | Maruyama | H01B 1/04 428/323 |
| 2011/0209901 A1* | 9/2011 | MacDonald | C08J 7/04 174/254 |
| 2011/0227245 A1 | 9/2011 | Swanson et al. | |
| 2011/0241063 A1 | 10/2011 | Winscom | |

\* cited by examiner

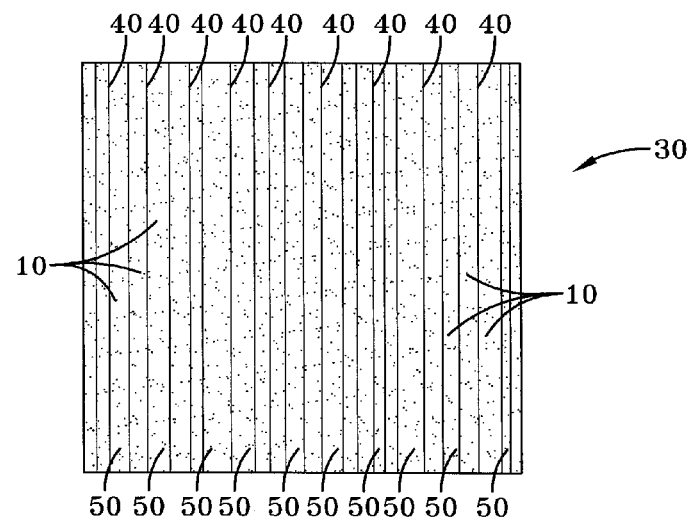
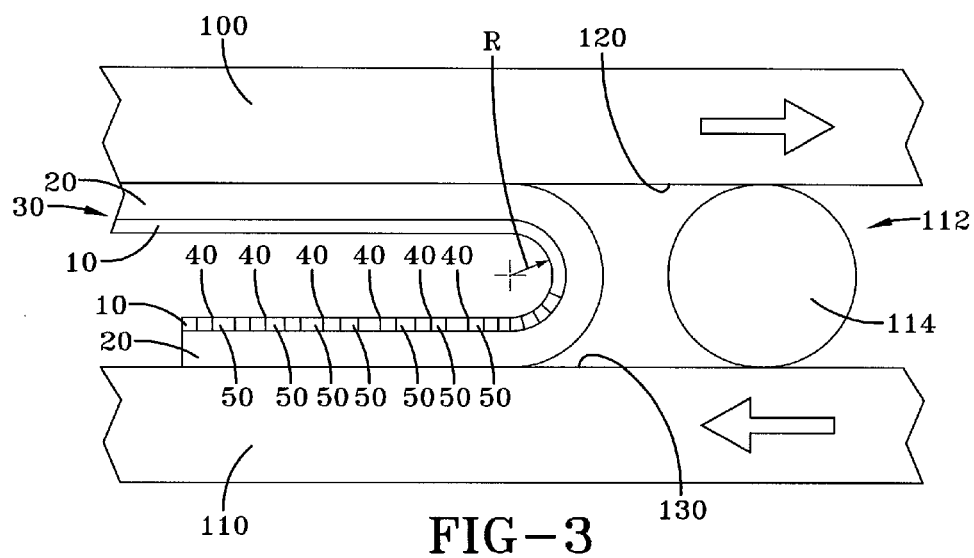

METHOD OF PATTERNING ELECTRICALLY-CONDUCTIVE FILM ON FLEXIBLE SUBSTRATES

CROSS-REFERENCE TO RELATED APPLICATION

This application claims the benefit of U.S. Provisional Application No. 61/632,236 filed on Jan. 20, 2012, the contents of which is incorporated herein by reference.

TECHNICAL FIELD

Generally, the present invention relates to methods of forming electrically-conductive electrodes. Particularly, the present invention relates to methods of forming electrically-conductive electrodes on flexible substrates. More particularly, the present invention relates to methods of forming patterned electrodes by controlling the cracking of a layer of electrically-conductive film, such as indium-tin-oxide (ITO), that is disposed on a flexible substrate.

BACKGROUND ART

Typical flat-panel displays, such as LC (liquid crystal) and plasma displays, utilize a thin film of electrically-conductive indium-tin-oxide (ITO) that is vacuum deposited on a rigid glass substrate to control various operating functions of the display. That is, during the production of such flat-panel displays, the ITO film is patterned into optically-transparent electrodes using conventional photolithographic techniques. In addition, production of flat-panel displays utilizing photolithographic techniques requires precise and accurate bonding of the electrodes to the driving circuitry of the display, which can be costly. Recently, however, the flat-panel display industry has sought to replace the use of rigid glass substrates with flexible substrates, such as those formed from flexible plastics, while still retaining the use of ITO or other electrically-conductive polymers to form the transparent electrodes using advanced printing and photolithographic techniques.

In addition, while ITO has the desired optical and electrical properties required for many electronics applications, including flat-panel displays and photovoltaic devices for example, ITO is brittle and is easily cracked when the substrate upon which the ITO film is carried is bent or flexed. As such, electronic devices using ITO tend to be fragile and require careful handling and, in some instances, may result in reduced production yields of such electronic devices. In contrast, electrically-conductive polymers, which are an alternative to ITO, have the advantage of being more flexible than ITO and are able to be used in manufacturing processes of electronic devices that utilize printing and photolithographic techniques. However, electrically-conductive polymers have a variety of drawbacks, including reduced electrical conductivity and reduced light transmission as compared to ITO.

Therefore, there is a need for a method of patterning an electrically-conductive film, such as indium-tin-oxide (ITO), into conductive electrodes on a flexible substrate that is low cost. In addition, there is a need for a method of patterning an electrically-conductive film, such as indium-tin-oxide (ITO), into conductive electrodes on a flexible substrate that is compatible with continuous roll-to-roll manufacturing processes. Furthermore, there is also a need for a method of patterning an electrically-conductive film, such as indium-tin-oxide (ITO), into conductive electrodes that are precisely defined. In addition, there is a need for a method of patterning an electrically-conductive film, such as indium-tin-oxide (ITO), on flexible substrates that is simple to execute and that eliminates the need for costly and environmentally-unfriendly materials and solvents.

SUMMARY OF THE INVENTION

In light of the foregoing, it is a first aspect of the present invention to provide a method of patterning a conductive film comprising, providing a flexible substrate having an electrically-conductive film disposed thereon to form a combined layer, bending the flexible substrate about a radius of curvature, and moving the radius of curvature along the combined layer to form at plurality of crack lines in the conductive film, wherein each pair of the plurality of crack lines defines and electrically isolates a conductive section therebetween.

Another aspect of the present invention is to provide a method of patterning a conductive film comprising providing a flexible substrate having an electrically-conductive film disposed thereon, so as to form an elongated combined layer, providing first and second substantially parallel plates that are spaced apart by a gap, attaching a portion of the substrate to each first and second plate, such that the combined layer is bent across the gap with a radius of curvature, and sliding one of the first and second plates relative to the other, so as to bend the combined layer by the radius of curvature, so as to form at plurality of crack lines in the conductive film, whereby each pair of the plurality of crack lines defines and electrically isolates a conductive section therebetween.

BRIEF DESCRIPTION OF THE DRAWINGS

These and other features and advantages of the present invention will become better understood with regard to the following description, appended claims, and accompanying drawings wherein:

FIG. 2 is a schematic representation of a transmission optical microscope image of the combined PET/ITO layer that shows the crack lines formed in the ITO film in accordance with the concepts of the present invention;

FIG. 3 is an elevational view showing the combined PET/ITO layer rolled between two flat glass plates that are separated at a predetermined distance to form crack lines in the ITO film in accordance with the concepts of the present invention.

DETAILED DESCRIPTION OF THE INVENTION

Figure 1A:
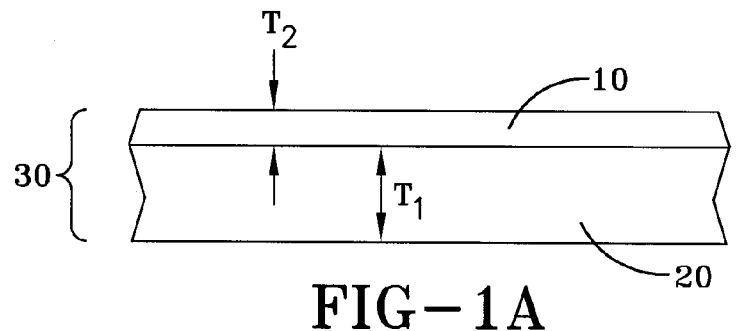
FIG. 1A is an elevational view showing a combined layer formed of a PET substrate and indium-tin-oxide (ITO) film disposed thereon in accordance with the concepts of the present invention.

A method of patterning electrically-conductive film that is disposed on a flexible substrate to form electrically-conductive electrodes is presented. In particular, a thin conductive film 10, which may comprise indium-tin-oxide (ITO) or other suitable material, is applied upon a flexible substrate 20 to form a combined layer 30, as shown in FIG. 1A. In one aspect, the flexible substrate 20 may comprise polyethylene terephthalate (PET), as well as any other suitably flexible material, such as plastic, for example. The ITO film 10 may be applied or otherwise disposed on the flexible substrate 20 using any suitable process, such as sputtering or vacuum deposition for example. Once the ITO film 10 is disposed on the flexible substrate 20, a stress force is applied to the combined layer 30 to crack the ITO film 10 into electrically isolated conductive sections. Specifically, the ability to crack the ITO film 10 is a result of its brittleness (i.e., inability to sustain a change in dimension without breaking) and the ability of the substrate 20 to be flexed.

In order to crack or otherwise pattern the electrically-conductive ITO film 10, stress is imparted to the ITO film 10 by mechanical flexing or by the application of thermal stress. Mechanical flexing is achieved by bending the combined layer 30 in a manner to be discussed, whereby the radius of curvature of the bend inversely controls the magnitude of the mechanical stress imparted to the substrate 20 and the ITO film 10. That is, the smaller the radius of curvature used to form the bend, the greater the amount of mechanical stress that is applied to the substrate 20 and to the ITO film 10. Alternatively, in the case of thermally treating the combined layer 30, the substrate 20 and the conductive ITO film 10 have different coefficients of thermal expansion, such that changes in temperature will produce a mechanical strain that is used to produce crack lines in the conductive ITO film 10.

Figure 1B:
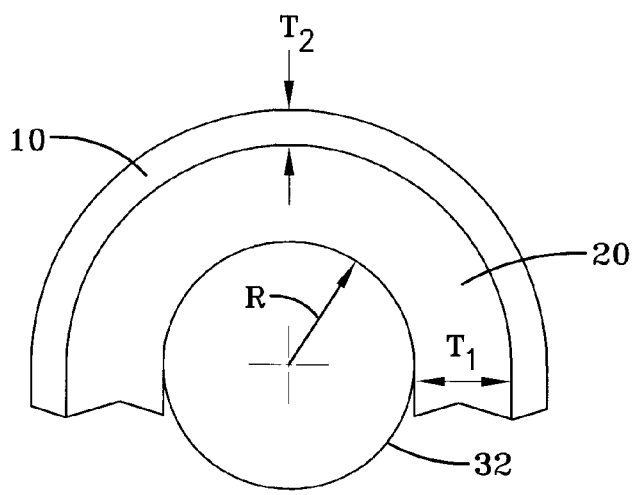
FIG. 1B is an elevational view showing the combined PET/ITO layer bent around a radius of curvature to form crack lines in the ITO film in accordance with the concepts of the present invention.
Figure 1C:
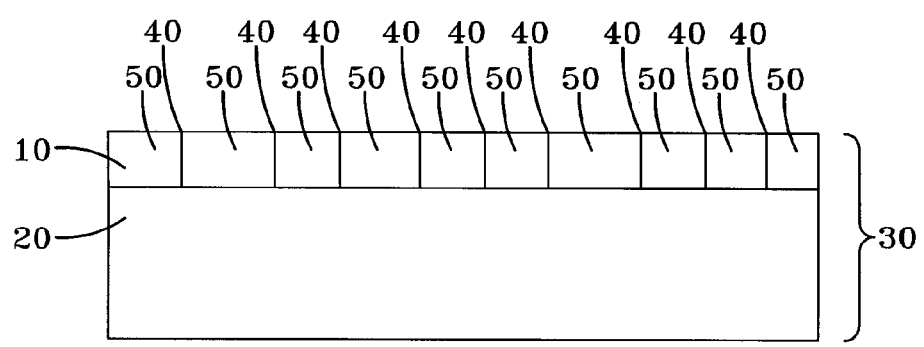
FIG. 1C is an elevational view showing crack lines that are formed in the ITO film after the combined PET/ITO layer has been bent in accordance with the concepts of the present invention.

Thus, after the ITO film 10 is disposed on the flexible substrate 20, mechanical stress is applied to the combined layer 30 by bending the substrate 20 so as to have a radius of curvature, designated as "R". In one aspect, the radius of curvature R may be created by simply bending the combined layer 30 upon itself, or by bending the combined section around a substantially cylindrical section 32, such as a rod, such that the combined layer extends around the radius of curvature R by a set amount, such as about 180 degrees for example, as shown in FIG. 1B. The bending stress imparted to the conductive ITO film 10 forms a plurality of uniformly spaced crack lines 40 in ITO film 10, as shown in FIGS. 1C and 2. The crack lines 40 are formed in the ITO film 10 as lines that extend in a direction that is substantially perpendicular to the direction in which the combined layer 30 is being bent. In addition, the spaced crack lines 40 define substantially uniform conductive strips or sections 50 therebetween in the ITO film 10. In addition, it should be appreciated that the crack lines 40 electrically isolate adjacent conductive strips or sections 50 from each other, allowing the conductive sections 50 to serve as electrically-conductive electrodes.

Continuing with reference to FIGS. 1A-B, the stress imparted by the mechanical bending of the combined layer 30, previously discussed, may be calculated in accordance with the following approach. It should be appreciated that for the purpose of the following discussion, the thickness of the conductive film 10 is typically several orders of magnitude thinner than the substrate 20. As such, the thickness of the conductive film 10 is disregarded when calculating the stress applied to the combined layer 30, as presented below. Specifically with regard to FIG. 1B, in the case where the substrate 20 is formed of PET and is bent by 180 degrees around the curved section 32 having a radius of curvature "R," the length of the inside surface of the substrate 20 that is adjacent to the radius of curvature R of the curved section 32 is equal to πR. The outside surface of the substrate 20 has a length that is longer than its inside surface, which allows the substrate 20 to accommodate the thickness, designated as "$T_1$," of the substrate film 20. In addition, the length of the substrate 20 is equal to $\pi T_1$ and the radius of curvature about which the substrate 20 is bent is increased to $R+T_1$, making the total length of the film $\pi(R+T_1)$. As such, the stress can be expressed as the relative increase in length of the substrate 20 that is required to accommodate the bend and is defined by equation:

$$\frac{\pi(R+T_1) - \pi R}{\pi R},$$

which simplifies to $T_1/R$. Thus, it is the ratio of the substrate thickness 20 to the radius of curvature R of the curved section 32 that is used to bend the combined layer 30 that defines the stress imparted to the combined layer 30, which ultimately causes crack lines 40 to form in the conductive ITO film 10.

In other words, as the flexible substrate 20 is bent around the radius of curvature R that is provided by the curved section 32, as shown in FIG. 1B, the outside surface of the substrate 20 elongates, and/or the inside surface of the substrate contracts, by an amount defined by the radius of curvature R and the thickness of the substrate $T_1$, so as to accommodate the bend. The length of the outside surface of the substrate 20 will exceed the length of the inside surface of the substrate 20 about the bend by π times the thickness $T_1$ of the substrate 20, as shown in FIG. 1B. As such, the relative amount of stress induced by the bend is equal to the ratio of the thickness $T_1$ of the substrate 20 relative to the radius of curvature R of the curved section 32 that is being used to bend the combined layer 30. For example, in the case where the substrate 20 comprises a substrate formed of PET having a thickness $T_1$ of about 7 mils or about 0.17 mm, and is tightly bent around a curved section 32 having a radius of curvature R of 1 mm, the % change in the length of the substrate 20 will be 17%, which is sufficient to produce crack lines 40 in the ITO film 10.

Alternatively, crack lines 40 may also be formed in the conductive ITO film by the application of thermal changes to the combined layer 30, so as to change the dimension of the substrate 20 relative to the dimension of the conductive ITO film 10. That is, if the coefficient of thermal expansion for the flexible substrate 20 is substantially different than the conductive film 10, crack lines 40 can be produced in the conductive film 10 by heating or cooling the combined layer 30. Furthermore, if the coefficient of thermal expansion is isotropic for the flexible substrate 20, changes in temperature of the combined layer 30 will produce randomly aligned crack lines in the conductive film 10. Alternatively, it is possible to use flexible substrates 20 that are uniformly stretched in one direction. Heating the combined layer 30 above the glass transition temperature will produce a large uniform contraction in one direction of the substrate 20 that can be used to produce uniform crack lines in the conductive film 10, similar to those produced by the bending technique previously discussed.

Thus, the crack lines 40 formed in the conductive film 10 serve to disrupt or at least greatly reduce the electrical conductivity of the conductive film 10, and thus serve to electrically isolate adjacent conductive sections or stripes 50 of conductive film 10. As such, the controlled cracking of the conductive ITO film 10 allows regular-spaced crack lines 40 to be formed that allow such a process to be used to form electrode patterns in the conductive film 10 of a precise shape and dimension. For example, uniform crack lines 40 that are separated by 5-10 microns can be produced by uniformly rolling a polyester PET substrate 20 that is coated with a thin film of indium-tin-oxide (ITO) 10. The cracks in the ITO film 10 form as lines that are perpendicular to the bend direction.

Figure 4:
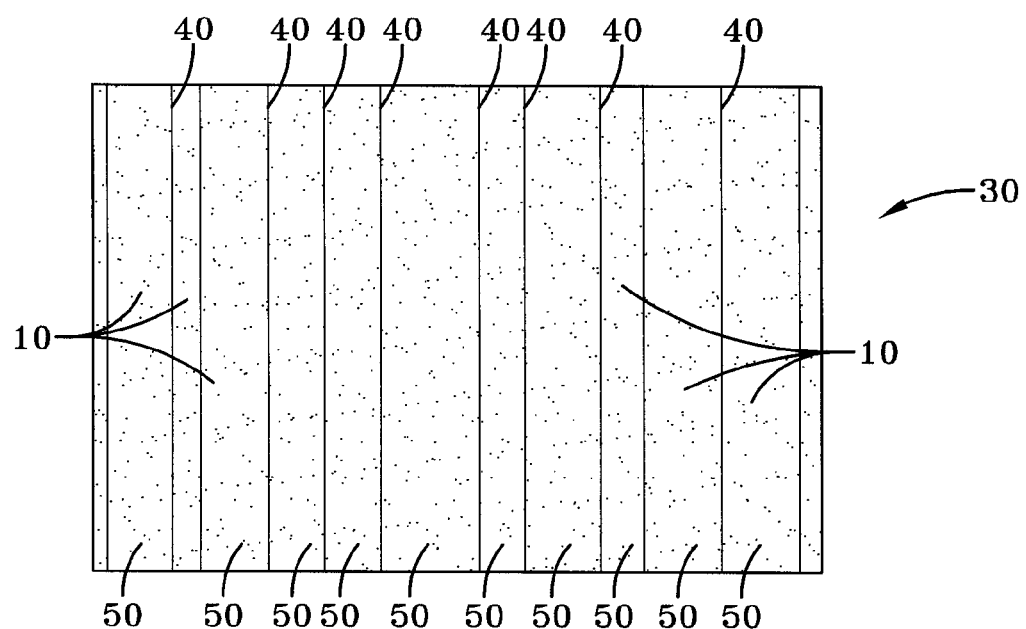
FIG. 4 is a schematic representation of a scanning electron microscope (SEM) image of the combined PET/ITO layer that shows the crack lines formed in the ITO film in accordance with the concepts of the present invention.

During experimental evaluation, cracks 40 were formed in the conductive ITO film 10 by positioning the combined layer 30 between two thick, opposed, flat glass plates 100 and 110 that are spaced apart by a gap 112 of a predetermined distance, as shown in FIG. 3. It should be appreciated that the plates 100,110 may be formed from any suitable material, such as aluminum, for example. In one aspect, the plates 100 and 110 may be separated by a rolling spacer 114, such as a cylindrical rod or other rollable item or roller, such as a ball bearing or bead, to maintain the plates 100,110 in a substantially parallel arrangement, to define the radius of curvature that is to be imparted to the combined layer 30, and to facilitate the movement of the plates 100,110 relative to each other. Specifically, the combined layer 30 is positioned, such that one end of the flexible substrate 20 is attached to an inner surface 120 of the glass plate 100, while the other end of the flexible substrate 20 is attached to an inner surface 130 of the other glass plate 110, as shown in FIG. 3. Next, the combined layer 30 is rolled between the two plates 100,110, whereby the ITO film 10 and the substrate 20 are bent by an amount defined by the radius of curvature R that is determined by the size of the gap 112. In one aspect, the flexible substrate 20 is bent by about 180 degrees in this configuration. As such, crack lines 40 form in the ITO film 10 along the bend or along the axis of curvature R in order to accommodate the stress that is imparted by the radius of curvature r defined by the GAP 112. For example, FIG. 4 shows an SEM (scanning electron microscope) image of the crack lines 40 produced by bending the combined layer 30, with the plates 100,110 spaced such that the gap 112 imparts a 1 mm radius of curvature to the combined layer 30.

Thus, in one aspect it, is contemplated that the distance separating the crack lines 40, which defines the width of the conductive sections 50, increases as the radius of curvature R used to bend the combined layer 30 increases, whereby the amount of such separation is dependent on various other criteria, including but not limited to the thickness of the ITO film 10, and the flexibility and brittleness of the ITO film 10 and the substrate 20. For example, for a radius of curvature of 1 mm or less, the crack lines are separated by about 2-8 microns, as shown in FIGS. 2 and 3. In another example, a radius of curvature of about 2 mm may produce crack lines that are separated by about 10-20 microns.

Continuing, after the ITO film 10 has been bent to form crack lines 40 therein, the electrical conductivity of the ITO film 10 remains essentially unchanged when measured along the crack lines 40, regardless of the radius of curvature R used to complete the bending process. For bends that utilize a tight or small radius of curvature R of approximately 1 mm or less, the conductivity measured perpendicular to the formed crack lines 40 decreases by over an order of magnitude. Table 1 below shows the parallel and perpendicular resistance (inverse of the conductivity) of the ITO film 10 as a function of the bend radius of curvature R, where it is shown that while the perpendicular conductivity (i.e., conductivity in the direction perpendicular to the crack lines 40) is greatly decreased with decreasing radius of curvature R, it is not eliminated.

| Sample | R-Perpendicular | R-Parallel | R-Perpendicular/R-Parallel |
|---|---|---|---|
| Sample #1 (R < 1 mm) | 14k Ohms | 0.7k Ohms | 20.0 |

-continued

| Sample | R-Perpendicular | R-Parallel | R-Perpendicular/R-Parallel |
|---|---|---|---|
| Sample #2 (R~1 mm) | 2.1k Ohms | 0.3k Ohms | 7.0 |
| Sample #3 (R~2.5 mm) | 3.5k Ohms | 0.7k Ohms | 5.0 |

Alternatively, the crack lines 40 may be amplified to increase the differential in the conductivity that is measured parallel to and perpendicular to the direction of the crack lines 40. For example, a light chemical etch with dilute HCL may be used to remove any remnants of ITO that remain in the crack lines 40, that would contribute to the electrical conduction across the crack lines 40. As a result, the conductivity of the crack lines 40 is further reduced.

In addition, to further reduce the conductivity of the crack lines 40, the substrate 20 may be stretched uni-axially in a direction perpendicular to the crack lines 40. Uni-axial stretching has been shown to increase the differential in the conductivity by another order of magnitude to over 500:1.

In addition, the method of forming electrically-conductive electrodes using the ITO cracking process described above may be used to form polymer dispersed liquid crystal (PDLC) shutters or windows. In addition, the differential conductivity between the parallel and perpendicular directions of the crack lines 40 allows individual conductive sections 50 between the crack lines 40 to be utilized in addressing applications by making electrical contact only across portions of the substrate 20 to charge the appropriate conductive sections 50. Because the electric field may be conducted across the crack lines 40, unaddressed conductive sections 50 are also charged to a lesser extent, depending on the frequency of the applied electric field. Furthermore, the differential conductivity will allow much lower frequencies to be used in such applications.

In yet another aspect, the conductive sections 50 resultantly defined by the space between consecutive cracks lines 40, which may be used as address lines for various electronic devices, such as an LCD (liquid crystal display), may be formed by cracking the conductive film 10 in crossed directions to form multiplexed address lines for use in various electronics applications. For example, in one aspect, the separation between adjacent crack lines 40 may be formed so as to about 5-20 microns, which also results in the width of the formed conductive sections or stripes 50 to be about 5-20 microns as well. Thus, because the pixel size of current commercially produced flat panel displays is about 100-200 microns, the bonding process utilized to couple the electrodes comprising the conductive sections 50 to the driving circuitry of the display does not require the same highly accurate alignment that would otherwise be necessary when using typical photolithographic patterned ITO stripes or sections.

Based on the foregoing, the advantages of the present invention are readily apparent. The main advantage of the present invention is that a method is provided for patterning an electrically-conductive film, such as indium-tin-oxide (ITO), on a flexible substrate into electrically-isolated conductive sections that form electrodes for various electronic device applications. Another advantage of the present invention is that a method of patterning an electrically-conductive film, such as indium-tin-oxide (ITO), on a flexible substrate into separate, conductive sections of ITO is simple to execute and may be carried out on existing continuous roll-to-roll processes, without the need for complicated photolithographic or printing processes currently being used. An additional advantage of the present invention is that a method of patterning an electrically-conductive film, such as indium-tin-oxide (ITO), on a flexible substrate allows electrodes to be bonded to a display driving circuit or other circuit without requiring an accurate alignment between them, which is required in traditional photolithographic patterned ITO stripes or sections, which reduces cost and fabrication complexity of flat panel displays. Another advantage of the present invention is that a method of patterning an electrically-conductive film, such as indium-tin-oxide (ITO), on a flexible substrate can be carried out in a high-throughput and low-cost process. Still another advantage of the present invention is that a method of patterning an electrically-conductive film, such as indium-tin-oxide (ITO), on a flexible substrate uses a reliable and economical process to produce electrically-conductive ITO sections that are insulated from one another. Yet another advantage of the present invention is that a method of patterning an electrically-conductive film, such as indium-tin-oxide (ITO), on a flexible substrate only requires a controlled bending of the substrate upon which the ITO film is carried to form electrically-conductive ITO lines. Still yet another advantage of the present invention is that a method of patterning an electrically-conductive film, such as indium-tin-oxide (ITO), on a flexible substrate immediately forms cracks upon the flexing and/or stretching of the substrate that carries the ITO film, so as to form conductive sections between the formed cracks. Another advantage of the present invention is that a method of patterning an electrically-conductive film, such as indium-tin-oxide (ITO), on a flexible substrate allows conductive electrodes to be formed in a manner in which the inactive inter-electrode area is minimized, while maximizing the active electrode area.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method of patterning a conductive film comprising:
   providing a flexible substrate having an electrically-conductive film disposed thereon to form a combined layer;
   bending said combined layer by a radius of curvature; and
   moving one end of said combined layer relative to another end of said combined layer about said radius of curvature, so that a section of said combined layer is continuously moved through said radius of curvature to form a plurality of crack lines in said conductive film of said section, wherein each pair of said plurality of crack lines defines and electrically isolates a conductive section therebetween.

2. The method of claim 1, wherein the thickness of said conductive film is less than the thickness of said substrate.

3. The method of claim 1, wherein said bending step is performed by bending said combined layer by about 180 degrees.

4. The method of claim 1, wherein said radius of curvature is about 1 mm.

5. The method of claim 1, wherein said radius of curvature is less than about 1 mm.

6. The method of claim 1, wherein said radius of curvature is between about 1 to 2.5 mm.

7. The method of claim 1, wherein said conductive film comprises indium-tin-oxide (ITO).

8. The method of claim 7, wherein said substrate comprises polyethylene terephthalate (PET).

9. The method of claim 1, wherein at said moving step, said ends of said combined layer are moved in opposite directions.

10. The method of claim 1, wherein said radius of curvature is defined by a curved surface, said bending step being performed by bending said flexible substrate against said curved surface.

11. A method of patterning a conductive film comprising:
    providing a flexible substrate having an electrically-conductive film disposed thereon, so as to form an elongated combined layer;
    providing first and second substantially parallel plates that are spaced apart by a gap;
    attaching a portion of said substrate to each said first and second plate, such that said combined layer is bent across said gap with a radius of curvature; and
    moving one of said first and second plates relative to the other said plate about said radius of curvature, so that a section of said combined layer is continuously moved through said gap and said radius of curvature, so as to form a plurality of crack lines in said conductive film, whereby each pair of said plurality of crack lines defines and electrically isolates a conductive section therebetween.

12. The method of claim 11, wherein the thickness of said conductive film is less than the thickness of said substrate.

13. The method of claim 11, wherein said combined layer is by about 180 degrees.

14. The method of claim 11, wherein said radius of curvature is about 1 mm.

15. The method of claim 11, wherein said radius of curvature is less than about 1 mm.

16. The method of claim 11, wherein said radius of curvature is between about 1 to 2.5 mm.

17. The method of claim 11, wherein said conductive film comprises indium-tin-oxide (ITO).

18. The method of claim 17, wherein said substrate comprises polyethylene terephthalate (PET).

19. The method of claim 11, wherein said first and second plates are spaced apart by at least one roller.

20. The method of claim 11, wherein at said moving step, said first and second plates are moved in opposite directions.

* * * * *